US006583257B2

(12) United States Patent
Warth et al.

(10) Patent No.: US 6,583,257 B2
(45) Date of Patent: Jun. 24, 2003

(54) COMPOSITION BASED ON COPOLYCARBONATES

(75) Inventors: Holger Warth, Dormagen (DE); Thomas Eckel, Dormagen (DE); Dieter Wittmann, Leverkusen (DE); Silke Kratschmer, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/962,289

(22) Filed: Sep. 24, 2001

(65) Prior Publication Data
US 2002/0123567 A1 Sep. 5, 2002

(30) Foreign Application Priority Data

Sep. 26, 2000 (DE) .......................... 100 47 483
Dec. 1, 2000 (DE) .......................... 100 59 608
Feb. 8, 2001 (DE) .......................... 101 05 714

(51) Int. Cl.$^7$ ............................... C08G 64/00
(52) U.S. Cl. .................... 528/196; 528/198; 525/67; 525/146; 525/148; 525/468; 524/117; 524/119; 524/123; 524/125; 524/127; 524/139; 524/140; 524/141; 524/145
(58) Field of Search ................ 524/127, 123, 524/117, 119, 125, 141, 140, 145, 196, 139; 525/67, 146, 148, 468

(56) References Cited

U.S. PATENT DOCUMENTS

| 4,631,311 A | * 12/1986 | Wingler et al. ............. 525/146 |
| 5,145,911 A | 9/1992 | Eckel et al. .................. 525/67 |
| 5,401,826 A | 3/1995 | Sakashita et al. ........... 528/204 |
| 5,470,938 A | 11/1995 | Sakashita et al. ........... 528/198 |
| 5,532,324 A | 7/1996 | Sakashita et al. ........... 525/462 |
| 5,750,602 A | * 5/1998 | Kohler et al. ............... 524/123 |
| 6,007,649 A | 12/1999 | Haas et al. ................ 156/62.2 |
| 6,326,423 B1 | * 12/2001 | Eckel et al. ................ 524/117 |

FOREIGN PATENT DOCUMENTS

| DE | 198 56 485 | 6/2000 |
| EP | 0 019 127 | 11/1980 |
| EP | 0 544 407 | 6/1993 |
| EP | 0 816 434 | 1/1998 |
| EP | 0 970 997 | 7/1999 |
| GB | 1 452 141 | 10/1976 |
| JP | 3-126756 | 5/1991 |
| WO | WO 99/36468 | * 7/1999 |

* cited by examiner

Primary Examiner—Terressa M. Boykin
(74) Attorney, Agent, or Firm—Joseph C. Gil; Aron Preis

(57) ABSTRACT

The invention relates to thermoplastic copolycarbonate compositions and moulded parts containing the latter having improved stress cracking resistance and thermal stability.

15 Claims, No Drawings

COMPOSITION BASED ON COPOLYCARBONATES

The invention relates to thermoplastic polycarbonate compositions and moulded parts containing the latter having increased stress cracking resistance and thermal stability.

The stress cracking resistance of moulded parts fabricated from polymers is always important in their production and in the use of the moulded parts if they come into contact with oils, cleaning agents and alcohols. Particularly in automobile construction and other external applications moulded parts that are as resistant as possible to chemicals and that on the one hand are stable at low temperatures and on the other hand exhibit a high thermal stability have been sought for a long time. The object therefore existed of finding a polycarbonate blend that exhibits an improved stress cracking resistance and higher thermal stability compared to polycarbonate blends containing polycarbonate formed from pure 2,2-bis(4-hydroxyphenyl)-propane as bisphenol, and that on the other hand retains the advantageous properties of polycarbonate blends such as an excellent low temperature toughness.

Copolycarbonates based on 4,4'-dihydroxydiphenyl and 2,2-bis(4-hydroxyphenyl)-propane have already been described as being particularly resistant to chemicals, heat stable and difficultly inflammable (see JP-A 5 117 382, EP-A 0 544 407, U.S. Pat. Nos. 5,470,938, 5,532,324 and 5,401,826), and compared to commercially available polycarbonate formed from pure bisphenol A, have equally good mechanical properties and transparency. However, the prior art does not contain any indication that these copolycarbonates may advantageously be used in polycarbonate blends with retention of the particularly good low temperature properties.

JP-A 03 126 756 describes thermoplastic resin compositions having improved heat resistance, impact strength, and resistance to oil and water. These resins are composed of aromatic polyester resin, aromatic polycarbonate and butadiene rubber.

EP-A 0 403 837 describes thermoplastic polycarbonate moulding compositions based on substituted dihydroxydiphenylcycloalkanes, other aromatic polycarbonates, for example based on bisphenol A, and grafted, particulate diene rubbers, and their use for the production of thermoplastic moulded parts. On account of the dihydroxy-diphenylcycloalkanes these moulding compositions have an improved heat resistance while retaining a good notched impact strength.

The object of the present invention is to provide thermoplastic polycarbonate compositions having an improved stress cracking resistance and improved thermal stability.

This object is achieved by copolycarbonate compositions containing
A) 2 to 98, preferably 5 to 97, particularly preferably 30 to 95 parts by weight of a thermoplastic aromatic copolycarbonate built up from 0.1 mole % to 46 mole % of compounds of the formula (I)

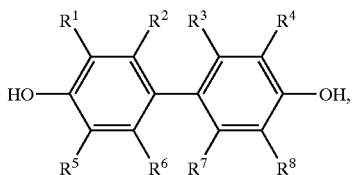
(I)

wherein
$R^1$ to $R^8$ independently of one another denote hydrogen, halogen, $C_1$ to $C_8$ alkyl, $C_1$ to $C_5$ cycloalkyl, $C_6$ to $C_{10}$ aryl and $C_7$ to $C_{12}$ aralkyl, and complementary amounts, i.e. 99.9 mole % to 54 mole %, of diphenols different from the compounds of the formula (I),
B) 0.5 to 50, preferably 2 to 40, particularly preferably 5 to 30 parts by weight of at least one graft polymer of
B1) 5 to 90 parts by weight of at least one vinyl monomer and
B2) 95 to 10 parts by weight of a rubber having a glass transition temperature of $\leq 10°$ C.

It has surprisingly been found that even with a small proportion of structural units according to formula (I) in the polycarbonate composition, the stress cracking resistance of moulded parts obtained therefrom is significantly improved.

The copolycarbonates according to the invention preferably contain according to component A) 11 to 34 mole % and particularly preferably 26 to 34 mole % of compounds of the formula (I).

Diphenols that are different from the compounds of the formula (I) are accordingly contained in complementary amounts, i.e. 99.99 to 54 mole %, preferably 89 to 66 mole %, particularly preferably 74 to 66 mole %.

$R^1$ to $R^8$ in formula (I) independently of one another preferably denote hydrogen, $C_1$–$C_4$ alkyl, phenyl, substituted phenyl or halogen, particularly preferably denote hydrogen, methyl or tert.-butyl, and particularly preferably all denote the same radical.

Particularly preferred compounds of the formula (I) are 4,4'-dihydroxydiphenyl (DOD) and 4,4'-dihydroxy-3,3'-5,5'-tetra-(tert.butyl)-diphenyl.

Preferred diphenol different from compounds of the formula (I) are diphenols of the formula (II)

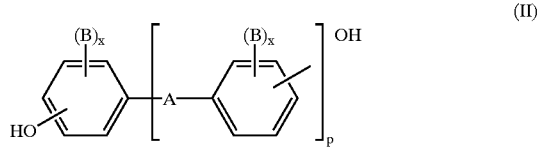
(II)

wherein
A denotes $C_1$–$C_5$ alkylene, $C_2$–$C_5$ alkylidene, $C_5$–$C_6$ cycloalkylidene, —O—, —SO—, —CO—, —S—, —SO$_2$—, $C_6$–$C_{12}$ arylene onto which further aromatic rings optionally containing heteroatoms may be condensed,
or a radical of the formula (IIa) or (IIb)

(IIb)

$$\begin{array}{c} -C^1- \\ (X^1)_m \\ R^5 \quad R^6 \end{array}$$

(IIb)

$$\begin{array}{c} CH_3 \\ | \\ -C- \\ | \\ CH_3 \end{array} \quad \begin{array}{c} CH_3 \\ | \\ C- \\ | \\ CH_3 \end{array},$$

B in each case denotes $C_1$–$C_{12}$ alkyl, preferably methyl, halogen, preferably chlorine and/or bromine
x in each case independently of one another is 0, 1 or 2,
p is 1 or 0, and
$R^5$ and $R^6$, which may be chosen individually for each $X^1$, independently of one another denote hydrogen or $C_1$–$C_6$ alkyl, preferably hydrogen, methyl or ethyl, $X^1$ denotes carbon, and m is an integer from 4 to 7, preferably 4 or 5, with the proviso that at least one atom is $X^1$ and $R^5$ and $R^6$ are simultaneously alkyl.

Preferred compounds of the formula (II) are 2,2-bis(4-hydroxyphenyl)propane, 1,1-bis(4-hydroxyphenyl)-3,3,5-trimethylcyclohexane and 1,3-bis[2-(4-hydroxyphenyl)-2-propyl]benzene, 1,1-bis(4-hydroxyphenyl)-1-phenylethane, 1,1-bis(4-hydroxyphenyl)cyclohexane, in particular 2,2-bis(4-hydroxyphenyl)propane (bisphenol A).

One compound of the formula (I) may be used with the formation of binary copolycarbonates, or also a plurality of compounds of the formula (I) may be used.

There may also be used one compound of the formula (II), with the formation of binary copolycarbonates, as well as a plurality of compounds of the formula (II).

The educts of the formulae (I) and (II) may obviously contain impurities resulting from the synthesis. A high degree of purity is however desirable and should be aimed for, and accordingly those educts having the highest possible purity are used.

According to DE-A 2 119 779 the production of polycarbonates is carried out under the participation of monomers of the formula (I) preferably in solution, and more specifically according to the phase boundary process and the homogeneous phase process.

Details of the production of polycarbonates according to the phase boundary process may be found for example in "Schnell", Chemistry and Physics of Polycarbonates, Polymer Reviews, Vol. 9, Interscience Publishers, New York, London, Sydney 1964 and in Polymer Reviews, Volume 10, "Condensation Polymers by Interfacial and Solution Methods", Paul W. Morgan, Interscience Publishers, New York, 1965, Chap. VIII, p. 325 and EP 971 790.

In addition polycarbonates may also be produced by the known melt production process (so-called melt transesterification process), which is described for example in DE-A 1 96 46 401 or in DE-A 1 42 38 123. In addition transesterification processes (acetate process and phenyl ester process) are described for example in U.S. Pat. Nos. 3,494,885, 4,386,186, 4,661,580, 4,680,371 and 4,680,372, in EP-A 26 120, 26 121, 26 684, 28 030, 39 845, 91 602, 97 970, 79 075, 146 887, 156 103, 234 913 and 240 301 as well as in DE-A 1 495 626 and 2 232 977.

The copolycarbonates according to the invention may contain various terminal groups. These are introduced by chain terminators. Chain terminators in the context of the invention are those of the formula (III)

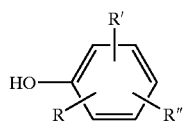

(III)

wherein

R, R' and R" independently of one another may denote H, optionally branched $C_1$–$C_{34}$ alkyl/cycloalkyl, $C_7$–$C_{34}$ alkaryl or $C_6$–$C_{34}$ aryl, for example butyl phenol, trityl phenol, cumyl phenol, phenol, octyl phenol, preferably butyl phenol or phenol.

The polycarbonates may contain minor amounts of 0.02 to 3.6 mole % (referred to the dihydroxy compound) of branching agents. Suitable branching agents are those compounds suitable for polycarbonate production containing three or more functional groups, preferably those containing three or more than three phenolic OH groups, for example 1,1,1-tri-(4-hydroxyphenyl)ethane and isatin biscresol.

The thermoplastic aromatic polycarbonates have mean molecular weights (weight average molecular weight $\overline{M}_w$, measured for example by ultracentrifugation or light scattering measurements) of 10,000 to 200,000, preferably 15,000 to 80,000.

The thermoplastic aromatic copolycarbonates may be used alone or in arbitrary mixtures.

A further constituent of the polycarbonate compositions according to the invention is the graft polymer according to component B, which may include one or more graft polymers.

Monomers B.1 are preferably mixtures of

B.1.1 50 to 99 parts by weight of vinyl aromatic compounds and/or nuclear substituted vinyl aromatic compounds (such as styrene, α-methylstyrene, p-methylstyrene, p-chlorostyrene) and/or methacrylic acid-($C_1$–$C_8$)-alkyl esters, such as methyl methacrylate, ethyl methacrylate) and B.1.2 1 to 50 parts by weight of vinyl cyanides (unsaturated nitriles such as acrylonitrile and methacrylonitrile) and/or (meth)acrylic acid-($C_1$–$C_8$)-alkyl esters such as methyl methacrylate, n-butyl acrylate, t-butyl acrylate and/or derivatives such as anhydrides and imides of unsaturated carboxylic acids such as maleic anhydride and N-phenylmaleimide.

Preferred monomers B.1.1 are selected from at least one of the monomers styrene, α-methylstyrene and methyl methacrylate, and preferred monomers B.1.2 are selected from at least one of the monomers acrylonitrile, maleic anhydride and methyl methacrylate. Particularly preferred monomers are B.1.1 styrene and B.1.2 acrylonitrile.

Suitable graft bases B.2 for the graft polymers B are for example diene rubbers, EP(D)M rubbers, i.e. those based on ethylene/propylene and optionally acrylate, polyurethane, silicone, chloroprene and ethylene/vinyl acetate rubbers.

Preferred graft bases B.2 are diene rubbers, for example and preferably based on butadiene or isoprene or mixtures of diene rubbers or copolymers of diene rubbers or their mixtures with further copolymerisable monomers, for example according to B.1.1 and B.1.2. The component B.2 preferably has a glass transition temperature of about <0° C., particularly preferably <−20° C. The graft base B.2 generally has a mean particle size ($d_{50}$ value) of 0.05 to 10 μm, preferably 0.1 to 5 μm, particularly preferably 0.2 to 1 μm. Particularly preferred is pure polybutadiene rubber, optionally with up to 30 wt. % (referred to the rubber base) of comonomers selected from styrene, acrylonitrile, methyl methacrylate or mixtures thereof.

Particularly preferred polymers B are for example ABS polymers (emulsions, bulk and suspension ABS), such as are described in DE-A 2 035 390 or in DE-A 2 248 242 or in Ullmanns Encyclopaedia of Industrial Chemistry, Vol. 19 (1980), p. 280 ff. The gel proportion in the graft base B.2 is at least 30 wt. %, preferably at least 40 wt. % (measured in toluene).

The graft copolymers B are produced by free-radical polymerisation, for example by emulsion, suspension, solution or bulk polymerisation, preferably by emulsion or bulk polymerisation.

Particularly suitable graft rubbers are also ABS polymers that are produced by redox initiation with an initiator system comprising an organic hydroperoxide and ascorbic acid according to U.S. Pat. No. 4,937,285.

Since in the graft reaction the graft monomers are, as is known, not necessarily completely grafted onto the graft base, according to the invention graft polymers B are also understood to include those products that are obtained by (co)polymerisation of the graft monomers in the presence of the graft base and that occur in the working up.

Suitable acrylate rubbers according to B.2 of the polymers B are preferably polymers of acrylic acid alkyl esters, optionally with up to 40 wt. %, referred to B.2, of other polymerisable, ethylenically unsaturated monomers. Preferred polymerisable acrylic acid esters include $C_1$–$C_8$ alkyl esters, for example methyl, ethyl, butyl, n-octyl and 2-ethylhexyl esters, halogenated alkyl esters, preferably halogen ($C_1$–$C_8$) alkyl esters such as chloroethyl acrylate, as well as mixtures of these monomers.

For the crosslinking monomers with more than one polymerisable double bond may be copolymerised. Preferred examples of crosslinking monomers are esters of unsaturated monocarboxylic acids with 3 to 8 C atoms and unsaturated monohydric alcohols with 3 to 12 C atoms, or saturated polyols with 2 to 4 OH groups and 2 to 20 C atoms, such as ethylene glycol dimethacrylate, allyl methacrylate; multiply unsaturated heterocyclic compounds such as trivinyl and triallyl cyanurate; poly-functional vinyl compounds such as divinyl benzene and trivinyl benzene; and also triallyl phosphate and diallyl phthalate.

Preferred crosslinking monomers are allyl methacrylate, ethylene glycol dimethacrylate, diallyl phthalate and heterocyclic compounds that contain at least three ethylenically unsaturated groups.

Particularly preferred crosslinking monomers are the cyclic monomers triallyl cyanurate, triallyl isocyanurate, triacryloylhexahydro-s-triazine, triallyl benzenes. The amount of the crosslinking monomers is preferably 0.02 to 5 wt. %, in particular 0.05 to 2 wt. %, referred to the graft base B.2.

With cyclic crosslinking monomers having at least three ethylenically unsaturated groups it is advantageous to restrict the amount to less than 1 wt. % of the graft base B.2.

Preferred "other" polymerisable ethylenically unsaturated monomers that in addition to the acrylic acid esters may optionally be used for the production of the graft base B.2 are for example acrylonitrile, styrene, α-methylstyrene, acrylamides, vinyl-$C_1$–$C_6$-alkyl ethers, methyl methacrylate and butadiene. Preferred acrylate rubbers as graft base B.2 are emulsion polymers that have a gel content of at least 60 wt. %.

Further suitable graft bases according to B.2 are silicone rubbers with graft-active sites, such as are described in DE-A 3 704 657, DE-A 3 704 655, DE-A 3 631 540 and DE-A 3 631 539.

The gel content of the graft base B.2 is determined at 25° C. in a suitable solvent (M. Hoffmann, H. Krömer, R. Kuhn, Polymeranalytik I and II, Georg Thieme-Verlag, Stuttgart 1977).

The mean particle size $d_{50}$ is the diameter above and below which in each case 50 wt. % of the particles lie, and can be determined by means of ultracentrifuge measurements (W. Scholtan, H. Lange, Kolloid, Z. and Z. Polymere 250 (1972), 782–1796).

The copolycarbonate composition may contain, as further constituents, polymers according to component C.

The component C comprises one or more thermoplastic vinyl (co)polymers C.1 and/or polyalkylene terephthalates C.2.

The copolycarbonate compositions may contain up to 45 parts by weight, preferably up to 35 parts by weight (referred to the total composition) of polymers according to component C).

Suitable as vinyl (co)polymers C.1 are polymers of at least one monomer from the group comprising vinyl aromatics, vinyl cyanides (unsaturated nitriles), (meth) acrylic acid-($C_1$–$C_8$)-alkyl esters, unsaturated carboxylic acids as well as derivatives such as anhydrides and imides of unsaturated carboxylic acids. Particularly suitable are (co) polymers of C.1.1 50 to 99 parts by weight, preferably 60 to 80 parts by weight of vinyl aromatics and/or nuclear-substituted vinyl aromatics such as for example styrene, α-methylstyrene, p-methylstyrene, p-chlorostyrene and/or methacrylic acid-($C_1$–$C_8$)-alkyl esters, such as methyl methacrylate, ethyl methacrylate, and C.1.2 1 to 50 parts by weight, preferably 20 to 40 parts by weight of vinyl cyanides (unsaturated nitrites) such as acrylonitrile and methacrylonitrile and/or (meth)acrylic acid-($C_1$–$C_8$)-alkyl esters such as methyl methacrylate, n-butyl acrylate, t-butyl acrylate, and/or unsaturated carboxylic acids such as maleic acid and/or derivatives such as anhydrides and imides, unsaturated carboxylic acids such as maleic anhydride and N-phenylmaleimide.

The (co)polymers C.1 are resin-like, thermoplastic and rubber-free. Particularly preferred is the copolymer of C.1.1 styrene and C.1.2 acrylonitrile.

The (co)polymers according to C.1 are known and can be produced by free-radical polymerisation, in particular by emulsion, suspension, solution or bulk polymerisation. The (co)polymers preferably have mean molecular weights $M_w$ (weight average, determined by light scattering or sedimentation) between 15,000 and 200,000.

The polyalkylene terephthalates of the component C.2 are reaction products of aromatic dicarboxylic acids or their reactive derivatives such as dimethyl esters or anhydrides, and aliphatic, cycloaliphatic or araliphatic diols, as well as mixtures of these reaction products.

Preferred polyalkylene terephthalates contain at least 80 wt. %, preferably at least 90 wt. %, referred to the dicarboxylic acid component, of terephthalic acid radicals, and at least 80 wt. %, preferably at least 90 mole %, referred to the diol component, of ethylene glycol radicals and/or butanediol-1,4 radicals.

The preferred polyalkylene terephthalates may contain, in addition to terephthalic acid esters, up to 20 mole %, preferably up to 10 mole % of radicals of other aromatic or cycloaliphatic dicarboxylic acids with 8 to 14 C atoms or aliphatic dicarboxylic acids with 4 to 12 C atoms, such as radicals of phthalic acid, isophthalic acid, naphthalene-2,6-dicarboxylic acid, 4,4'-diphenyldicarboxylic acid, succinic acid, adipic acid, sebacic acid, azelaic acid or cyclohexanediacetic acid.

The preferred polyalkylene terephthalates may contain, in addition to ethylene glycol radicals or butanediol-1,4 radicals, up to 20 mole %, preferably up to 10 mole %, of other aliphatic diols with 3 to 12 C atoms or cycloaliphatic diols with 6 to 21 C atoms, for example radicals of propanediol-1,3, 2-ethylpropanediol-1,3, neopentyl glycol, pentanediol-1,5, hexanediol-1,6, cyclohexanedimethanol-1, 4, 3-ethylpentanediol-2,4, 2-methylpentanediol-2,4, 2,2,4-trimethylpentanediol-1,3, 2-ethylhexanediol-1,3, 2,2-diethylpropanediol-1,3, hexanediol-2,5, 1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(4-β-hydroxyethoxyphenyl)-propane and 2,2-bis-(4-hydroxypropoxyphenyl)-propane (DE-A 2 407 674, 2 407 776, 2 715 932).

The polyalkylene terephthalates may be branched by incorporating relatively small amounts of trihydric or tetrahydric alcohols or tribasic or tetrabasic carboxylic acids, for example according to DE-A 1 900 270 and U.S. Pat. No. 3,692,744. Examples of preferred crosslinking agents are trimesic acid, trimellitic acid, trimethylolethane and trimethylolpropane, and pentaerythritol.

Particularly preferred are polyalkylene terephthalates that have been produced only from terephthalic acid and its reactive derivatives (for example its dialkyl esters) and ethylene glycol and/or butanediol-1,4, and mixtures of these polyalkylene terephthalates.

Mixtures of polyalkylene terephthalates contain 1 to 50 wt. %, preferably 1 to 30 wt. %, of polyethylene terephthalate, and 50 to 99 wt. %, preferably 70 to 99 wt. %, of polybutylene terephthalate.

The polyalkylene terephthalates that are preferably used generally have an intrinsic viscosity of 0.4 to 1.5 dl/g, preferably 0.5 to 1.2 dl/g, measured in phenol/odichlorobenzene (1:1 parts by weight) at 25° C. in an Ubbelohde viscosimeter.

The polyalkylene terephthalates can be prepared by methods known per se (Kunststoff-Handbuch, Vol. VIII, p. 695 ff., Carl-Hanser-Verlag, Munich 1973).

The polycarbonate composition according to the invention may contain flame retardants, particularly preferred being phosphorus-containing flame retardants.

Phosphorus-containing flame retardants in the context of the invention are particularly preferably selected from the groups comprising monomeric and oligomeric phosphoric acid and phosphonic acid esters, phosphonatamines and phosphazenes, wherein mixtures of several components selected from one or various of these groups may also be used as flame retardants. Other halogen-free phosphorus compounds not specially mentioned here may also be used, alone or in arbitrary combinations with other halogen-free phosphorus compounds.

Preferred monomeric and oligomeric phosphoric acid and/or phosphonic acid esters are phosphorus compounds of the general formula (IV)

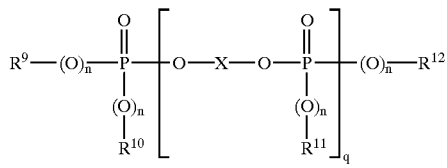

(IV)

wherein
  $R^9$, $R^{10}$, $R^{11}$ and $R^{12}$ denote in each case independently of one another optionally halogenated $C_1$–$C_8$ alkyl, or $C_5$–$C_6$ cycloalkyl, $C_6$–$C_{20}$ aryl or $C_7$–$C_{12}$ aralkyl optionally substituted in each case by alkyl, preferably $C_1$–$C_4$ alkyl, and/or halogen, preferably chlorine or bromine,
  n is independently of one another 0 or 1,
  q is 0 to 30, and
  X denotes a mononuclear or polynuclear aromatic radical with 6 to 30 C atoms, or a linear or branched aliphatic radical with 2 to 30 C atoms that may be OH-substituted and may contain up to 8 ether bonds.

Preferably $R^9$, $R^{10}$, $R^{11}$ and $R^{12}$ independently of one another denote $C_1$–$C_4$ alkyl, phenyl, naphthyl or phenyl-$C_1$–$C_4$-alkyl. The aromatic groups $R^9$, $R^{10}$, $R^{11}$ and $R^{12}$ may in turn be substituted by halogen and/or alkyl groups, preferably chlorine, bromine and/or $C_1$–$C_4$-alkyl. Particularly preferred aryl radicals are cresyl, phenyl, xylenyl, propylphenyl or butylphenyl, as well as the corresponding brominated and chlorinated derivates thereof.

X in the formula (IV) preferably denotes a mononuclear or polynuclear aromatic radical with 6 to 30 C atoms. This is preferably derived from diphenols of the formula (II).

n in the formula (IV) may independently of one another be 0 or 1, and n is preferably equal to 1.

q denotes values from 0 to 30. When using mixtures of different components of the formula (IV), mixtures preferably with numerically averaged q values of 0.3 to 20, particularly preferably 0.5 to 10, especially 0.5 to 6, may be used.

X particularly preferably denotes

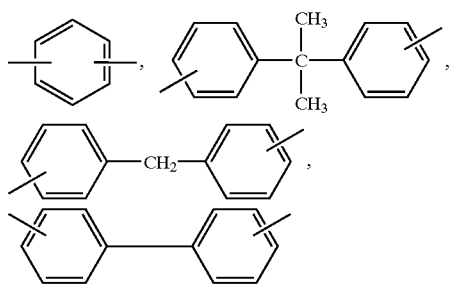

or their chlorinated or brominated derivatives, and in particular X is derived from resorcinol, hydroquinone, bisphenol A or diphenylphenol. X is particularly preferably derived from bisphenol A.

The use of oligomeric phosphoric acid esters of the formula (IV) that are derived from bisphenol A is particularly advantageous since the compositions containing this phosphorus compound have a particularly high stress cracking resistance and hydrolysis resistance as well as a particularly low tendency to form encrustations in ejection moulding processing. Moreover, a particularly high heat resistance can be achieved with these flame retardants.

The monophosphates (q=0) and oligophosphates (q=1–30) may also be used as mixtures.

Monophosphorus compounds of the formula (IV) are in particular tributyl phosphate, tris-(2-chloroethyl)-phosphate, tris-(2,3-dibromopropyl)-phosphate, triphenyl phosphate, tricresyl phosphate, diphenylcresyl phosphate, diphenyloctyl phosphate, diphenyl-2-ethylcresyl phosphate, tri-(isopropylphenyl)-phosphate, halogen-substituted aryl phosphates, methylphosphonic acid dimethyl ester, methylphosphenic acid diphenyl ester, phenylphosphonic acid diethyl ester, triphenylphosphine oxide or tricresylphosphine oxide.

The phosphorus compounds according to formula (IV) are known (EP-A 363 608, EP-A 640 655) or can be produced in a similar way by methods known per se (see for example Ullmanns Encyclopaedia of Industrial Chemistry, Vol. 18, p. 301 ff. 1979; Houben-Weyl, Methods of Organic Chemistry, Vol. 12/1, p. 43; Beilstein Vol. 6, p. 177).

The mean q values may be found by determining the composition of the phosphate mixture (molecular weight distribution) by a suitable method (gas chromatography (GC)) high pressure liquid chromatography (HPLC), gel permeation chromatography (GPC)), from which the mean values for q are then calculated.

Phosphonatamines are preferably compounds of the formula (V)

 (V)

in which

A denotes a radical of the formula (Va)

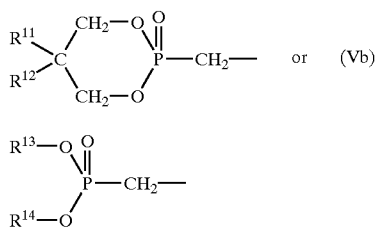

$R^{11}$ and $R^{12}$ independently of one another denote unsubstituted or substituted $C_1$–$C_{10}$ alkyl or unsubstituted or substituted $C_6$–$C_{10}$ aryl, $R^{13}$ and $R^{14}$ independently of one another denote unsubstituted or substituted $C_1$–$C_{10}$ alkyl or unsubstituted or substituted $C_6$–$C_{10}$ aryl, or $R^{13}$ and $R^{14}$ together denote unsubstituted or substituted $C_3$–$C_{10}$ alkylene, y denotes the integers 0, 1 or 2, and $B^1$ independently denotes hydrogen, optionally halogenated $C_2$–$C_8$ alkyl, or unsubstituted or substituted $C_6$–$C_{10}$ aryl.

$B^1$ preferably independently denotes hydrogen, ethyl, n-propyl or iso-propyl that may be substituted by halogen, unsubstituted $C_6$–$C_{10}$ aryl or $C_6$–$C_{10}$ aryl substituted by $C_1$–$C_4$ alkyl and/or halogen, in particular phenyl or naphthyl.

Alkyl in $R^{11}$, $R^{12}$, $R^{13}$ and $R^{14}$ independently preferably denotes methyl, ethyl, n-propyl, iso-propyl, n-, iso-, sec.- or tert.-butyl, pentyl or hexyl.

Substituted alkyl in $R^{11}$, $R^{12}$, $R^{13}$ and $R^{14}$ independently preferably denotes $C_1$–$C_{10}$ alkyl substituted by halogen, in particular singly or doubly substituted methyl, ethyl, n-propyl, iso-propyl, n-, iso-, sec., or tert.-butyl, pentyl or hexyl.

$C_6$–$C_{10}$ aryl in $R^{11}$, $R^{12}$, $R^{13}$ and $R^{14}$ independently preferably denotes phenyl, naphthyl or binaphthyl, in particular o-phenyl, o-naphthyl, o-binaphthyl, which may be substituted (in general singly, doubly or triply substituted) by halogen.

$R^{13}$ and $R^{14}$ may together with the oxygen atoms to which they are directly bound and the phosphorus atom, form a ring structure.

The following may be mentioned by way of example and preferably: 5,5,5',5',5",5",-hexamethyltris-(1,3,2-dioxaphosphorinane-methane)amino-2,2',2,-trioxide of the formula (Va-1)

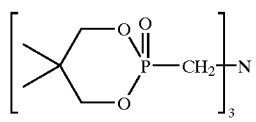

(Experimental product XPM 1000 from Solutia Inc., St. Louis, USA), 1,3,2-dioxaphosphorinane-2-methanamine, N-butyl-N[(5,5-dimethyl-1,3,2-dioxaphosphorinan-2-yl) methyl]-5,5-dimethyl-, P,2-dioxides; 1,3,2-dioxaphosphorinane-2-methanamine, N-[[5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N-N-dibutyl-5,5-dimethyl-, 2-oxide, 1,3,2-dioxaphosphorinane-2-methanimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)methyl]-5,5-dichloromethyl-, P,2-dioxide; 1,3,2-dioxaphosphorinane-2-methanamine, N-[(5,5-dichloromethyl-1,3,2-dioxaphosphorinan-2-yl)methyl]-5,5-dichloromethyl-N-phenyl, P,2-dioxide; 1,3,2-dioxaphosphorinane-2-methanamine, N,N-di-(4-chlorobutyl)-5,5-dimethyl-2-oxides; 1,3,2-dioxaphosphorinane-2-methanimine, N-[(5,5-dimethyl-1,3,2-dioxaphosphorinan-2-yl)methane]-N-(2-chloroethyl)-5,5-di(chloromethyl)-, P2-dioxide.

Also preferred are:

compounds of the formulae (Va-2) or (Va-3)

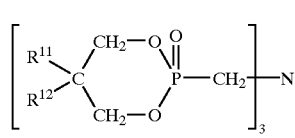

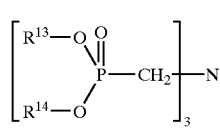

wherein $R^{11}$, $R^{12}$, $R^{13}$ and $R^{14}$ have the meanings given above.

Particularly preferred are compounds of the formulae (Va-2) and (Va-1).

The production of the phosphonatamines is described for example in U.S. Pat. No. 5,844,028.

Phosphazenes are compounds of the formulae (VIa) and (VIb)

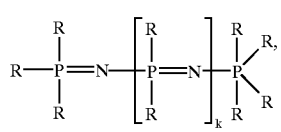

wherein

R is in each case identical or different and denotes amino, in each case optionally halogenated, preferably halogenated with fluorine, $C_1$–$C_8$ alkyl, or $C_1$ to $C_8$ alkoxy, $C_5$ to $C_6$ cycloalkyl in each case optionally substituted by alkyl, preferably $C_1$–$C_4$ alkyl, and/or halogen, preferably chlorine and/or bromine, $C_6$ to $C_{20}$ aryl, preferably phenyl or naphthyl, $C_6$ to $C_{20}$ aryloxy, preferably phenoxy, naphthyloxy, or $C_7$ to $C_{12}$ aralkyl, preferably phenyl-$C_1$–$C_4$-alkyl, k denotes 0 or an integer from 1 to 15, preferably an integer from 1 to 10.

The following may be mentioned by way of example:

propoxyphosphazene, phenoxyphosphazene, methylphenoxyphosphazene, aminophosphazene and fluoralkylphosphazenes.

Phenoxyphosphazene is preferred.

The phosphazenes may be used alone or as a mixture. The radical R may always be the same, or 2 or more radicals in the formulae (Ia) and (1b) may be different.

Phosphazenes and their preparation are described for example in EP-A 728 811, DE-A 1 961 668 and WO 97/40092.

The flame retardants may be used alone or in arbitrary mixtures with one another, or mixed with other flame retardants.

The moulding compositions according to the invention may contain at least one of the conventional additives such as lubricants and mould release agents, for example pentaerythritol tetrastearate, nucleating agents, antistatic agents, stabilisers, fillers and reinforcing substances as well as colourants and pigments.

The filled or reinforced moulding compositions may contain up to 60 wt. %, preferably 10 to 40 wt. %, referred to the filled or reinforced moulding composition, of fillers and/or reinforcing substances. Preferred reinforcing substances are glass fibres. Preferred fillers, which may also have a reinforcing action, are glass spheres, mica, silicates, quartz, talcum, titanium dioxide and wollastonite.

The moulding compositions according to the invention may contain up to 35 wt. %, referred to the total composition, of a further, optionally synergistically acting flame retardant. Examples of further flame retardants that may be mentioned include organic halogen compounds such as decabromobisphenyl ether, tetrabromobisphenol, inorganic halogen compounds such as ammonium bromide, nitrogen compounds such as melamine, melamine-formaldehyde resins, inorganic hydroxide compounds such as Mg and Al hydroxide, inorganic compounds such as antimony oxides, barium metaborate, hydroxoantimonate, zirconium oxide, zirconium hydroxide, molybdenum oxide, ammonium molybdate, zinc borate, ammonium borate, barium metaborate, talc, silicate, silicon dioxide and tin oxide as well as siloxane compounds. Such phosphorus compounds are described in EP-A 363 608, EP-A 345 522 and DE-OS 197 21 628.

The compositions according to the invention are prepared by mixing the respective constituents in a manner known per se and then melt-compounding and melt-extruding the mixtures at temperatures of 200° C. to 300° C. in conventional equipment such as internal mixers, extruders and double-shaft screw extruders. The mixing of the individual constituents may take place in a manner known per se either in succession or simultaneously, and more specifically at about 20° C. (room temperature) as well as at elevated temperature.

The thermoplastic moulding compositions according to the invention are suitable on account of their excellent flame resistance, in particular their short afterburning time, and their good mechanical properties and high heat resistance, for the production of all types of moulded parts, in particular those having to meet stringent requirements as regards mechanical properties.

The moulding compositions may be used to produce any type of moulded parts. In particular moulded parts may be produced by injection moulding. Examples of moulded parts that can be produced include: all types of housing parts, for example for domestic equipment such as juice presses, coffee-making machines, mixers, for office machines such as monitors, printers, copiers, or coverplates for the building and construction sector and parts for the vehicle sector. They may also be used in the electrotechnology sector since they have extremely good electrical properties.

The moulding compositions according to the invention may furthermore be used to produce internal structural parts for tracked vehicles, wheelcaps, housings of electrical equipment containing small transformers, housings for information distribution and transmission equipment, housings and linings for medical purposes, massage equipment and housings for the latter, children's toys, two-dimensional wall elements, housings for safety devices, rear spoilers, thermally insulated transporting containers, equipment for holding or looking after small animals, moulded parts for sanitaryware and bath fittings, cover grids for ventilation openings, moulded parts for garden houses and sheds, and housings for garden tools.

Further applications are possible as data technology and filing equipment: telecommunications equipment such as telephones and telefaxes, computers, printers, scanners, plotters, monitors, keyboards, typewriters, dictating machines, etc., as electrical equipment: power supply units, charging devices, small transformers for computers and maintenance electronics, low voltage transformers, etc., as garden tools: garden furniture, lawn mower housings, hoses and housings for garden watering equipment, garden houses, foliage trimmers, shredders, choppers, spraying equipment, etc., in the furniture sector: worktops, furniture laminates, roller shutter units, office furniture, tables, chairs, seats, cabinets, shelves, door units, window units, bed boxes, etc., as sports/games equipment: toy vehicles, seats, pedals, sports equipment, bicycles, table tennis tables, home-training equipment, golf caddies, snowboards, external parts of boats, camping equipment, beach baskets, etc., internal/external use in the building sector: domestic fittings, profiled strips, pipework, cables, rolling shutter units, letterboxes, lamp housings, roof tiles, flagstones, dividing walls, cable ducts, floor strips and borders, plug sockets, etc., in the vehicle/tracked vehicle sector: wall linings, roof linings, seat frames, seats, benches, tables, luggage compartments, wheelcaps, rear spoilers, mudguards, rear flaps, bonnets, side parts, etc.

A further form of processing of the moulding compositions is the production of moulded parts by thermoforming from previously fabricated sheets or films.

The present invention accordingly also provides for the use of the moulding compositions according to the invention for the production of all types of moulded parts, preferably the types mentioned above, as well as the moulded parts formed from the compositions according to the invention.

The following examples serve to illustrate the invention in more detail.

EXAMPLES

Components

A1 Copolycarbonate of 30 mole % 4,4'-dihydroxydiphenyl (DOD) and 70 mole % of bisphenol A with a mean molecular weight (weight average) of 24970, determined by means of gas permeation chromatography against polystyrene as standard.

A2 Copolycarbonate as in A1, but with $\overline{M}_w$ of 25620.

A3 Copolycarbonate as in A1, but with $\overline{M}_w$ of 25190.

A4 Copolycarbonate as in A1, but with $\overline{M}_w$ of 25050.

A5 Polycarbonate based on bisphenol A (Makrolon® 2600, Bayer A G, Leverkusen, Germany).

B Graft polymer of 40 parts by weight of a copolymer of styrene and acrylonitrile in a ratio of 73:27 on 60 parts by weight of particulate crosslinked polybutadiene rubber ($d_{50}$=0.34 μm) produced by emulsion polymerisation.

C Styrene/acrylonitrile copolymer with a styrene/acrylonitrile ratio of 72:28 and an intrinsic viscosity of 0.55 dl/g measured in dimethylformamide at 20° C.

Additives (stabiliser, mould release agent)

The polycarbonate compositions according to the invention are produced by compounding the constituents as well as additives at temperatures of 240° C. to 300° C. in a double-screw extruder.

The composition is shown in Table 1.

TABLE 1

| Example | 1 | 2 | 3 | 4 | Comparison |
|---|---|---|---|---|---|
| A1 | 70 | — | — | — | — |
| A2 | — | 70 | — | — | — |
| A3 | — | — | 70 | — | — |
| A4 | — | — | — | 70 | — |
| A5 | — | — | — | — | 70 |
| B | 13 | 13 | 13 | 13 | 13 |
| C | 17 | 17 | 17 | 17 | 17 |
| Additives | 0.85 | 0.85 | 0.85 | 0.85 | 0.85 |

Table 2 shows the results of the investigations with regard to the outer fibre strain. The samples are subjected to selected outer fibre strains in an isooctanol/toluene mixture (1:1) over a period of 5 minutes. In the comparison sample an outer fibre strain of 1% produced edge cracks, but apart from this the sample did not exhibit any cracks. With a strain of 1.2% the sample fractured. The samples according to the invention did not exhibit any negative findings. With an outer fibre strain of 2.4%, over a period of 68 to 150 minutes the samples according to the invention also exhibited cracks.

OR: crack-free; KR: edge cracks. The time indicates how long the sample was kept in the solvent mixture at the specified strain until cracks or fracture occurred. "—" indicates no result.

TABLE 2

Outer fibre strain

| Examples | 1 | 2 | 3 | 4 | 5 (Comparison) |
|---|---|---|---|---|---|
| 1.00% | — | — | — | — | KR/OR Fracture after 5 mins. |
| 1.20% | — | — | — | — | Fracture after 5 mins. |
| 2.4% | Fracture after 150 mins. | Fracture after 113 mins. | Fracture after 87 mins. | Fracture after 68 mins. | |

In a further experiment the samples are kept for 14 days in isooctanone/toluene (1:1) and then, at an outer fibre strain of 2.4%, the time in minutes is measured until cracks occur. The results obtained are shown in Table 3.

TABLE 3

| Examples | 1 | 2 | 3 | 4 | 5 (Comparison) |
|---|---|---|---|---|---|
| Outer fibre strain 2.4% Fracture after | 76 mins. | 30 mins. | 38 mins. | 33 mins. | immediate |

The notched impact strength according to ISO 180 1A of the samples according to the invention as well as of the comparison example is measured at room temperature and at 0° C. The results given in Table 4 do not show any deterioration compared to the comparison example, within the range of measurement accuracy.

TABLE 4

Notched impact strength $a_k$

| | Examples | | | | |
|---|---|---|---|---|---|
| $a_k$ [kJ/m²] at | 1 | 2 | 3 | 4 | 5 (Comparison) |
| Room temperature | 80 | 88 | 84 | 82 | 84 |
| 0° C. | 65 | 62 | 61 | 63 | 68 |

The thermal stability of the samples is measured at 290° and 300° C. The results are reproduced in Table 5. Small sample plates are produced at various temperatures by injection moulding and are then optically evaluated.

TABLE 5

Thermal stability

| Examples | 1 | 2 | 3 | 4 | 5 (Comparison) |
|---|---|---|---|---|---|
| 290° C. | 4 | 3 | 2 | 2 | 4 |
| 300° C. | 2 | 2 | 1 | 2 | 4–5 |

The larger the number, the more damaged the sample, as manifested by defects on the surface. The numbers 1 and 2 denote no to minimal surface defects or streak formation, while the numbers 4 or 5 denote marked to very marked streak formation. It can be seen that all the moulding compositions according to the invention have an improved thermal stability compared to comparison example 5.

What is claimed is:

1. Copolycarbonate compositions containing
   A) 2 to 98 parts by weight of a thermoplastic aromatic copolycarbonate built up from 0.1 mole % to 46 mole % of compounds of the formula (I)

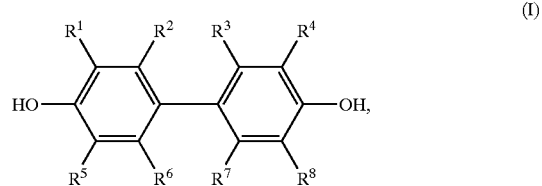

(I)

wherein
   $R^1$ to $R^8$ independently of one another denote hydrogen, halogen, $C_1$ to $C_8$ alkyl, $C_1$ to $C_5$ cycloalkyl, $C_6$ to $C_{10}$ aryl and $C_7$ to $C_{12}$ aralkyl,
   and complementary amounts, i.e. 99.9 mole % to 54 mole %, of diphenols different from the compounds of the formula (I), and B) 1 to 50 parts by weight of at least one graft polymer of
  B1) 5 to 90 parts by weight of at least one vinyl monomer and
  B2) 95 to 10 parts by weight of a rubber having a glass transition temperature of $\leq 10°$ C.

2. Copolycarbonate compositions according to claim 1, wherein component A, in addition to the diphenol of the formula (I), is built up from diphenols of the formula (II)

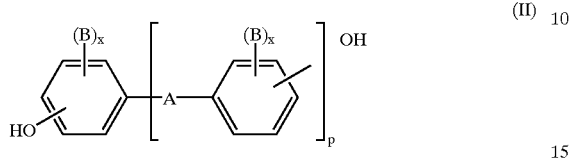

wherein

A denotes $C_1$–$C_5$ alkylene, $C_2$–$C_5$ alkylidene, $C_5$–$C_6$ cycloalkylidene, —O—, —SO—, —CO—, —S—, —$SO_2$—, $C_6$–$C_{12}$ arylene onto which further aromatic rings optionally containing heteroatoms may be condensed,
or a radical of the formula (IIa) or (IIb)

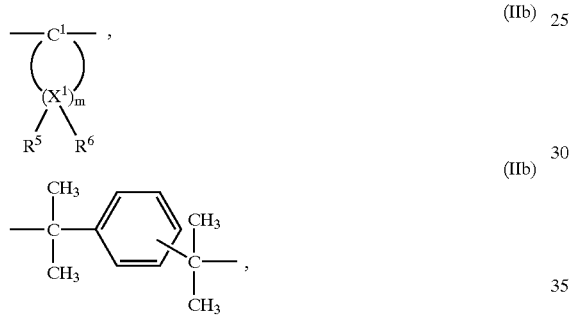

B in each case denotes $C_1$–$C_{12}$ alkyl or halogen,
x in each case independently of one another is 0, 1 or 2,
p is 1 or 0, and
$R^5$ and $R^6$, which may be chosen individually for each $X^1$, independently of one another denote hydrogen or $C_1$–$C_6$ alkyl,
$X^1$ denotes carbon, and
m is an integer from 4 to 7, with the proviso that at least one atom is $X^1$ and $R^5$ and $R^6$ are simultaneously alkyl.

3. Copolycarbonate composition according to claim 2, wherein the diphenol of the formula (II) is 2,2-bis(4-hydroxyphenyl)propane (bisphenol A).

4. Copolycarbonate composition according to claim 1, wherein the thermoplastic resin C is selected from
  C1) a copolymer or mixtures of copolymers of
    C1.1) 50 to 99 parts by weight of vinyl aromatics and/or nuclear-substituted vinyl aromatics and/or (meth)acrylic acid ($C_1$–$C_8$) alkyl esters, and
    C1.2) 1 to 50 parts by weight of vinyl cyanides and/or (meth)acrylic acid ($C_1$–$C_8$) alkyl esters and/or anhydrides and imides of unsaturated carboxylic acids and
  C2) polyalkylene terephthalate or mixtures of polyalkylene terephthalates,
  or mixtures thereof.

5. Copolycarbonate composition according to claim 1, wherein the rubber B.2 is selected from a diene rubber, acrylate rubber, silicone rubber or ethylene-propylene-diene rubber, or mixtures thereof.

6. Copolycarbonate composition according to claim 1, containing halogen-free flame retardant.

7. Copolycarbonate composition according to claim 6, wherein the flame retardant is selected from a phosphorus compound of the formula (IV)

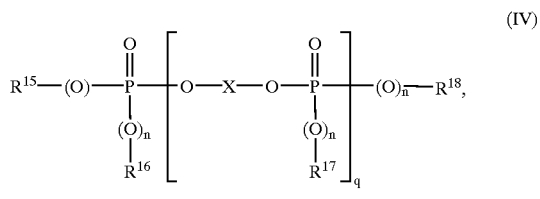

wherein $R^{15}$, $R^{16}$, $R^{17}$, $R^{18}$ independently of one another denote $C_1$–$C_8$ alkyl, $C_5$–$C_6$ cycloalkyl, $C_6$–$C_{10}$ aryl or $C_7$–$C_{12}$ aralkyl, n independently of one another is 0 or 1, q is an integer from 1 to 5 or, in the case of mixtures, has an average value between 1 and 5, X denotes a mononuclear or polynuclear aromatic radical with 6 to 30 C atoms.

8. Method of using a copolycarbonate composition according to claim 1 for the production of moulded parts.

9. Method of using a copolycarbonate composition according to claim 1 for external applications.

10. Method of using a copolycarbonate composition according to claim 1 in the automobile sector.

11. Method of using a copolycarbonate composition according to claim 1 in the electrical engineering sector.

12. Moulded part containing a thermoplastic copolycarbonate composition according to claim 1.

13. Housing parts containing a thermoplastic copolycarbonate composition according to claim 1.

14. The copolycarbonate composition of claim 1 further containing as component C) a thermoplastic resin selected from the group consisting of vinyl (co)polymers and polyalkylene terephthalate.

15. A copolycarbonate composition containing
  A) 2 to 98 parts by weight of a thermoplastic aromatic copolycarbonate built up from 34 to 26 mole % of monomers of formula (I)

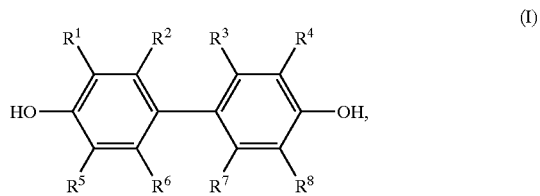

wherein $R^1$ to $R^8$ independently of one another denote hydrogen, halogen, $C_1$ to $C_8$ alkyl, $C_1$ to $C_5$ cycloalkyl, $C_6$ to $C_{10}$ aryl and $C_7$ to $C_{12}$ aralkyl, and complementary amounts of monomers of formula (II)

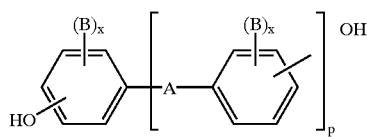
(II)

wherein

A denotes $C_1$–$C_5$ alkylene, $C_2$–$C_5$ alkylidene, $C_5$–$C_6$ cycloalkylidene, —O—, —SO—, —CO—, —S—, —SO$_2$—, $C_6$–$C_{12}$ arylene onto which further aromatic rings optionally containing heteroatoms may be condensed, or a radical of the formula (IIa) or (IIb)

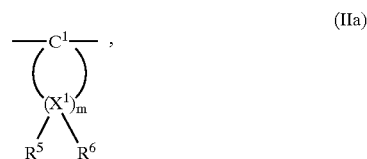
(IIa)

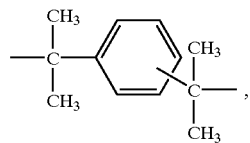
(IIb)

B in each case denotes $C_1$–$C_{12}$ alkyl or halogen,
x in each case independently of one another is 0, 1 or 2,
p is 1 or 0, and
$R^5$ and $R^6$, which may be chosen individually for each $X^1$, independently of one another denote hydrogen or $C_1$–$C_6$ alkyl,
$X^1$ denotes carbon, and
m is an integer from 4 to 7, with the proviso that at least one atom is $X^1$ and $R^5$ and $R^6$ are simultaneously alkyl, and B) 1 to 50 parts by weight of at least one graft polymer of
B1) 5 to 90 parts by weight of at least one vinyl monomer and
B2) 95 to 10 parts by weight of a rubber having a glass transition temperature of $\leq 10°$ C.

* * * * *